United States Patent [19]
Gorelik

[11] 4,399,909
[45] Aug. 23, 1983

[54] CHAIN FOR A TROLLEY CONVEYOR SYSTEM

[76] Inventor: Roman Gorelik, 1150 S. Glencoe, Denver, Colo. 80222

[21] Appl. No.: 210,273

[22] Filed: Nov. 26, 1980

[51] Int. Cl.³ .............................................. B65G 17/38
[52] U.S. Cl. ................................ 198/852; 104/172 B; 474/210
[58] Field of Search ............................. 198/852, 853; 104/172 B, 172 C; 474/210, 211

[56] References Cited

U.S. PATENT DOCUMENTS

| | | | |
|---|---|---|---|
| 2,753,982 | 7/1956 | Fredrikson | 198/852 |
| 3,343,499 | 9/1967 | Burrows | 104/172 B |
| 3,394,608 | 7/1968 | Johnson | 474/210 |

Primary Examiner—Robert C. Watson
Assistant Examiner—Douglas D. Watts
Attorney, Agent, or Firm—Gregg I. Anderson

[57] ABSTRACT

A trolley conveyor system chain for pulling trays of the conveyor through horizontal turns and climbing and descending grades. A link of the chain has a single pair of vertical and a single pair of horizontal wheels mounted thereon. A Y or vertical axis of the vertical wheels and an X or horizontal axis of the horizontal wheels intersect at a point and a link mechanism maintains the horizontal wheels in an ideal position relative to a chain rail assembly on which the wheels rotate and also aligns the chain to prevent collapse of the chain under tensile and compressive forces.

17 Claims, 14 Drawing Figures

CHAIN FOR A TROLLEY CONVEYOR SYSTEM

BACKGROUND OF THE INVENTION

1. Field of Invention

This invention relates to chains for use in pulling a trolley over a track. More particularly, the invention relates to chains of the type that make horizontal turns and climb and descend grades.

2. Brief Description of the Prior Art

Trolley conveyor systems are known that move trays along a predetermined path defined by a pair of parallel tracks to transport boxed or packaged materials within a storage or production facility. In a prior art conveyor system, a chain consisting of hollow tubular tow bars interconnected by a three axle link incrementally spaced along the predetermined path pulls the trays. The path includes both horizontal turns and climbs and descents in a vertical plane.

The chain in this prior art conveyor system is partially enclosed within a chain rail assembly located intermediate the pair of tracks. The chain rail assembly consists of four separate rails partially enclosing the link. The chain is subject to tension and compression forces as it is separately driven to pull the trays.

The link of the prior art includes a single pair of horizontal wheels, which wheels support the weight of the chain and assist the vertical wheels in guiding the chain along the path. The horizontal wheels are rotatably mounted on one axle and each horizontal wheel travels between upper and lower rails of the chain rail assembly. Two pairs of vertical wheels, which serve to guide the chain along the path and through turns, are mounted on half-link extensions equidistant fore and aft of the horizontal wheels. The extensions are therefore connected to each other by cylindrical bearings on the horizontal wheel axle. The vertical wheels are mounted on the other two axles of the link and also travel between the rails of the chain rail assembly. The axles of the vertical wheels are connected to the tow bars by cylindrical bearings.

The chain therefore follows the path of the chain rail assembly, pulling the trays along the tracks. When the chain must climb a grade, the fore and aft extensions of the link pivot about another cylindrical bearing on the horizontal wheel axle. In making a horizontal turn, the tow bars pivot about the two vertical wheel axles.

It is therefore seen that the prior art conveyor system uses three axles to a link between tow bars. Each axle has a cylindrical bearing. As the chain is pulled along the path of the chain rail assembly, the link is loaded at each of the three axles. Each axle has a cylindrical bearing subject to maximum loading as the chain is pulled along a straight line path and which bearings must be lubricated to reduce associated wear and maintain performance.

The prior art link uses the two pairs of vertical wheels which contact the chain rail assembly to maintain the pair of horizontal wheels at all times perpendicular to a tangent through the curve of a horizontal turn made by the chain rail assembly. However, because the vertical wheels are positioned by and spaced away from the horizontal wheels on extensions, the horizontal wheels do not precisely ride on the chain rails, but ride slightly off of the rails. This in turn subjects the horizontal wheels to some wear as a horizontal turn is made.

It would be advantageous over the prior art to have a link including a single pair of horizontal wheels and a single pair of vertical wheels whose rotational axes intersect at a single point. The prior art link horizontal and vertical wheels act at essentially three points along the length of the link, one for each pair of wheels. Using the three spaced apart pairs of wheels of the link of the prior art, the chain rail assembly often has to follow compelx "S" curves in order for the link of the chain to pull a tray through a simple horizontal turn. If all wheels acted essentially at a single point, the chain rail assembly curve would be a simple horizontal turn and the horizontal wheels would ride on and more precisely follow the path of the chain rail assembly.

SUMMARY AND OBJECTS OF THE INVENTION

The principal object of the present invention is to provide a link for a trolley conveyor system chain that acts essentially at a single point.

Another object of the present invention is to lower initial cost as well as maintenance costs in a conveyor system, while increasing performance.

Still another object of the present invention is to allow a simpler design for the chain rail assembly of a conveyor system.

A further object of the present invention is to provide a trolley conveyor system that does not collapse as the chain is subjected to tensile and compressive forces.

In accordance with the objects of the invention, a trolley conveyor system chain includes a link having a frame pivotally mounted on a single vertical axle, which has a pair of vertical wheels mounted at either end thereof, and a pair of horizontal wheels rotatably mounted on horizontal axles integrally extending away from the frame. The horizontal and vertical wheels are positioned between four separate rails forming a chain rail assembly. A rearward end of a leading tubular tow bar is universally connected to the vertical axle to pivot about both an X axis of the link, coaxial with the axis of rotation of the horizontal wheels, and a Y axis of the link, coaxial with the axis of rotation of the vertical wheels, which axes intersect at a single point. A forward end of a trailing tow bar in the direction of conveyor travel is rigidly connected to the vertical axle.

A link mechanism or system slideably relative to the frame and rigidly mounted on the two tow bars on either side thereof, defines four pivot points. The second and third pivot points are fixed relative to the leading and trailing tow bars respectively. A first pivot point, and a fourth pivot point cooincident with the Y axis directly opposite the first pivot point, are always aligned along the X axis by the link mechanism so that the angle between the leading and trailing tow bars is always bisected by the X axis. The X axis, i.e. the rotational axis of the horizontal wheels, is therefore always perpendicular to a tangent through the curvilinear path of the chain rail assembly at the point of intersection of the X and Y axes.

When the link is used to universally connect adjacent members, the vertical and horizontal wheels, confined within the chain rail assembly aligns the tow bars. Therefore, even though universally connected, the tow bars do not pivot out of alignment when subjected to tensile and compressive forces.

In an alternative embodiment, spring bias means are utilized to interconnect the leading tow bar and the trailing tow bar to the link. In this manner the angle between the two tow bars is generally bisected by the X axis of the link.

DESCRIPTION OF THE PREFERRED EMBODIMENTS

Figure 1:
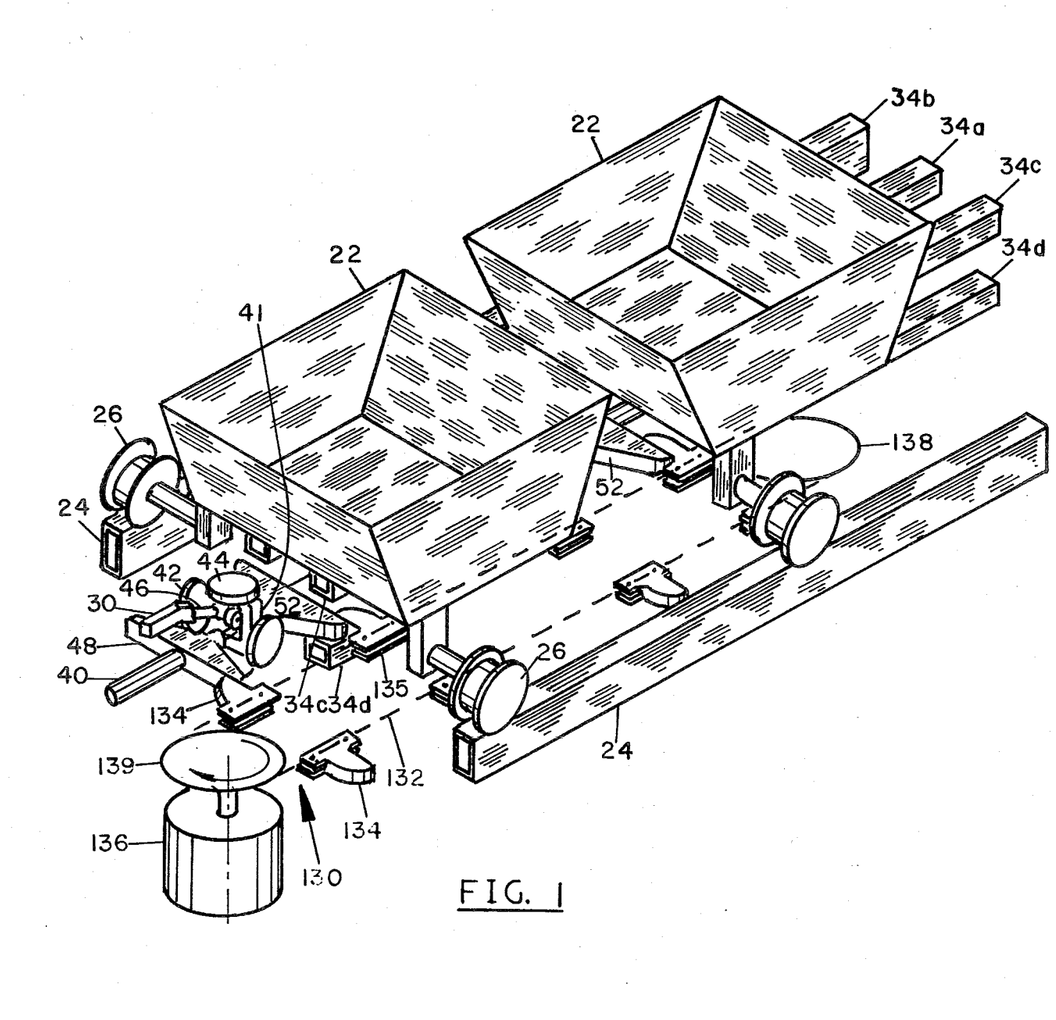
FIG. 1 is a fragmentary perspective view of a trolley conveyor system utilizing the chain of the present invention, a drive system for the conveyor system seen schematically.
Figure 2:
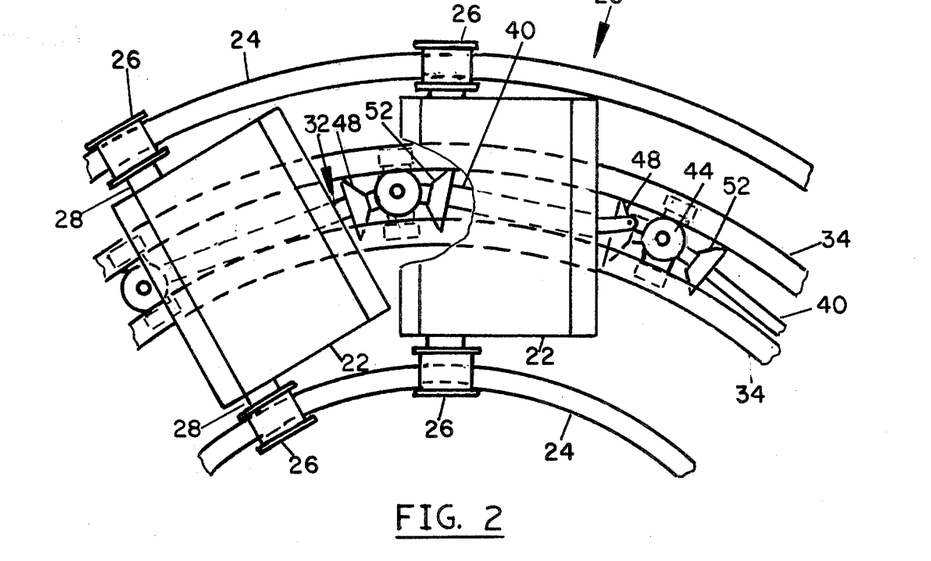
FIG. 2 is a fragmentary plan view of the horizontal curve of a trolley conveyor system, with portions of the trays of the trolley conveyor system broken away to show the chain of the present invention.

A segment of a trolley conveyor system 20 utilizing the present invention is seen in FIGS. 1 and 2. Such a conveyor system is useful in the transportation of boxed or packaged material such as mail or the like within a manufacturing or storage facility. The conveyor system 20 is adapted to move in three dimensions by making left or right horizontal turns and climbing and descending grades.

The conveyor system 20 includes a plurality of trays 22 extending at spaced intervals continuously over the length of the conveyor system. The trays are open at the top and have walls and a bottom for containing the material to be transported. A pair of parallel trolley tracks 24 define the path over which the trays move. A pair of flanged horizontal wheels 26 extend laterally from each of the trays to rotatably contact the track 24. The sheels 26 are rotatably mounted from the underside of one end of each tray 22 through a pair of stub axles 28. A connecting rod 30 is also connected to the underside of the trays 22 at the end where the wheels 26 are connected. The connecting rod extends away from the wheels, under the tray toward the leading end of the tray of the conveyor system and downward to pivotally connect through a universal joint 46 and a fork yoke 47 (FIG. 2) to a continuous chain 32.

The continuous chain 32 is subjected to tensile and compressive forces as it is moved by a drive system 130 to, be discussed more fully hereinafter, and includes a plurality of connecting members or links 38 incrementally spaced apart by hollow elongated arms or tow bars 40. A leading tow bar leads the link in the path of conveyor travel, while a trailing tow bar trails the link in the direction of conveyor travel. The chain 32 follows a path defined by a chain rail assembly 34 of generally square transverse cross section (FIG. 3) to the path of travel of the conveyor system 20. The chain rail assembly is located between the trolley tracks 24 and is formed of four separate rails 34a, 34b, 34c and 34d, spaced equidistantly from each other. The chain rail assembly partially encloses the chain. Each of the rails has a pair of bearing surfaces 36 that face, respectively, the two adjacent rails. For example, rail 34a has bearing surfaces 36 which face rails 34d and 34b.

Figure 4:
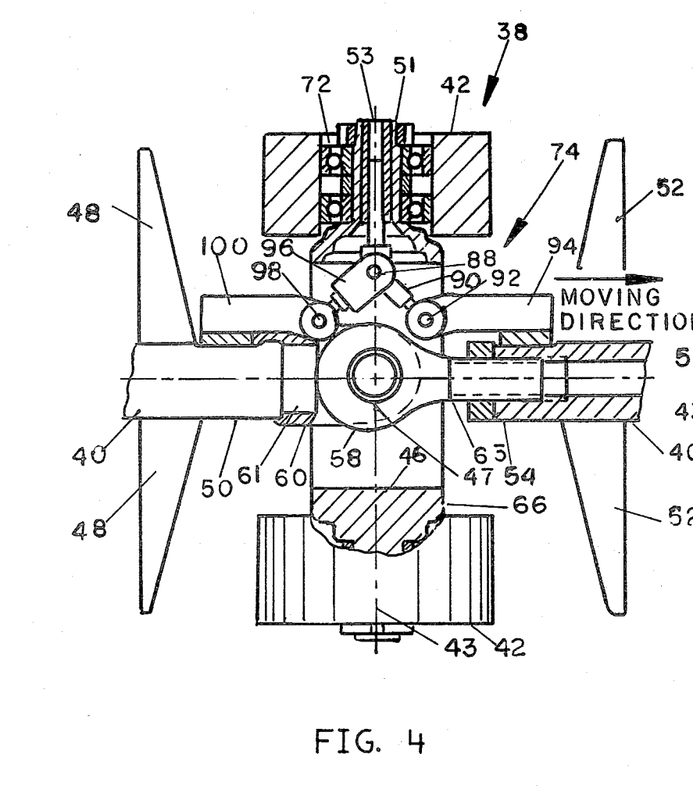
FIG. 4 is an enlarged sectional view taken along line A—A of FIG. 3.
Figure 5:
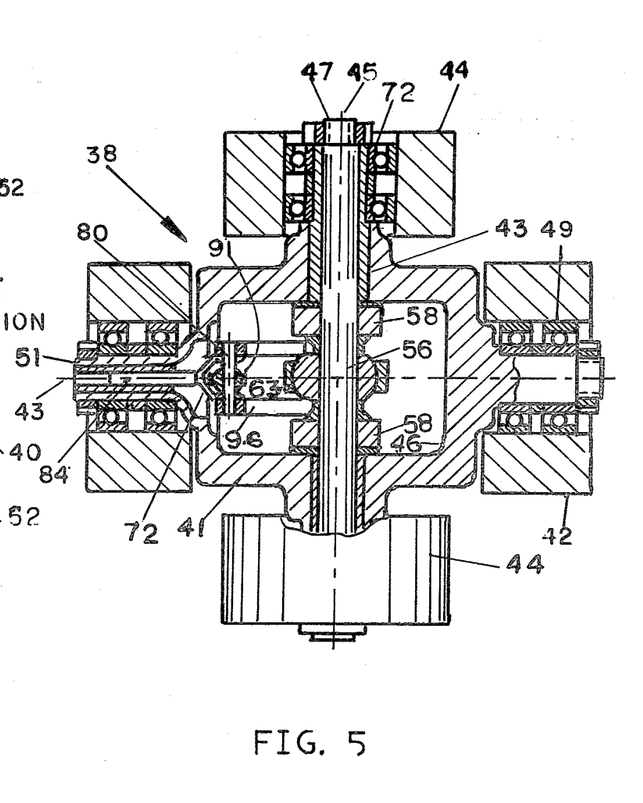
FIG. 5 is an enlarged sectional view taken along line C—C of FIG. 3.

The link 38 includes a generally rectangular frame 41 with an enlarged opening 46 aligned along the direction of conveyor travel (FIGS. 4 and 5). Cylindrical bearings 43 in the frame journal a vertical axle 47, coaxial with a Y axis 45 extending vertically through the frame of the link. An X axis 43 is perpendicular to and intersecting the Y axis and extends horizontally from the frame of the link in a direction generally transverse to the path of conveyor travel. The frame has relatively short integral axles 49 and 51 extending along the X axis and away from the frame, axle 51 having a bore or opening 53 extending through the axle's entire length.

A single pair of horizontal wheels 42 coaxial with the X axis 43 are rotatably mounted on axles 49 and 51. A single pair of vertical wheels 44 coaxial with the Y axis 45 are rotatably mounted at either end of the vertical axle 47. The vertical wheels and horizontal wheels travel on the bearing surfaces 36 of the rails 34a through 34d (FIG. 3) and guide the chain 32 along the predetermined three dimensional path. The rail assembly and the horizontal and vertical wheels align adjacent tow bars universally connected to the link 38 to prevent collapse of the chain as it is subjected to tensile and compressive forces.

Roller bearings 72 conventionally fitted around the axles 49 and 51 allow for rotatably mounting of the horizontal wheels 42. Similar roller bearings 72 are mounted on either end of the vertical axle 47 at the point where it extends beyond the frame 41 to provide for rotatable mounting of the vertical wheels 44.

Figure 3:
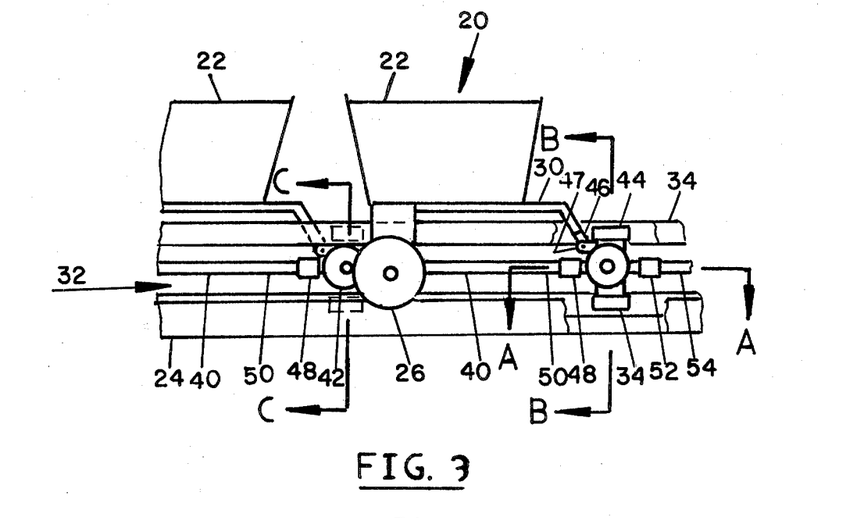
FIG. 3 is a fragmentary side elevation of the trolley conveyor system, with a portion of the track and chain rail broken away to show the chain of the present invention.

The Y axis 45 and X axis 43 intersect at a single point 49. This single point represents each link 38 as it moves along the chain rail assembly 34. The single point 49 lies essentially at the center of the chain rail assembly (FIG. 3).

In making a single link 38 a part of the chain 32, a forward end 50 of the trailing tubular tow bar 40 is rigidly connected about vertical axle 47, through the opening 46 in the frame 41 by a fork yoke 58. A hollow circumferential fitting 60 of the fork yoke 58 fits over a shoulder 61 on the forward end of the hollow tow bar 40 (FIG. 4). The circumferential fitting is rigidly connected to the shoulder by welding. The forward end of the trailing tow bar is pivotal in a horizontal plane only about Y axis 45 because the vertical axle is journalled in the frame 41.

A self-lubricating spherical bearing 63 universally connects a rearward end 54 of the leading tow bar 40 to the vertical axle 47 of the link 38 (FIGS. 4 and 5). The spherical bearing 63 is mounted intermediate upper and lower arms of the yoke 58 on the vertical axle. A threaded connection between spherical bearing 63 and tow bar 40 results in a rigid connection, as seen in FIG. 4. Thus, the rearward end 54 of the leading tow bar 40 is pivotally connected about the Y axis 45 of the link 38 to turn in a horizontal plane, when the chain makes a horizontal turn. The rearward end 54 is also pivotal about the X axis 43 to allow turns in a vertical plane, as the link climbs or descends a grade. The overall chain 32 moves in both horizontal and vertical planes.

The links 38 of the chain 32 of the present invention maintain the horizontal wheels 42 in the ideal position, perpendicular to a line tangent to a horizontal curve defined by the chain rail assembly 34 at the particular location of single point 49 by a four link mechanism or system 74 (FIGS. 4 through 8). Four interconnected pivot points 76, 78, 80 and 82 are associated with the four link mechanism, which mechanism is collapsible and expandable along the horizontal axis 43 between pivot points 76 and 80.

Figure 6:
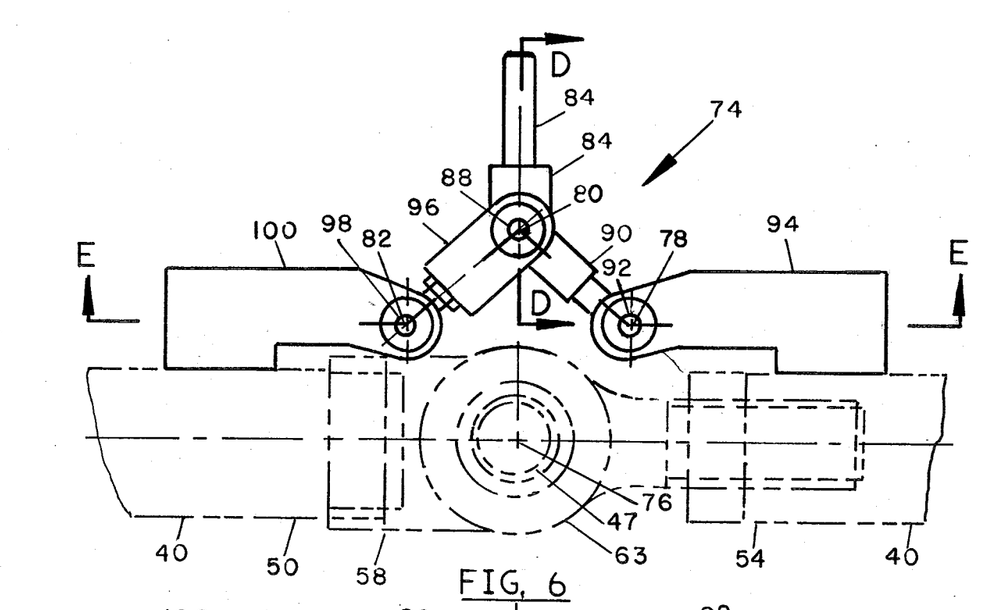
FIG. 6 is an enlarged plan view of the four link mechanism of the present invention, the frame of the chain being removed for clarity and the vertical axle and its connection of the leading and trailing tow bars shown in phantom line.
Figure 7:
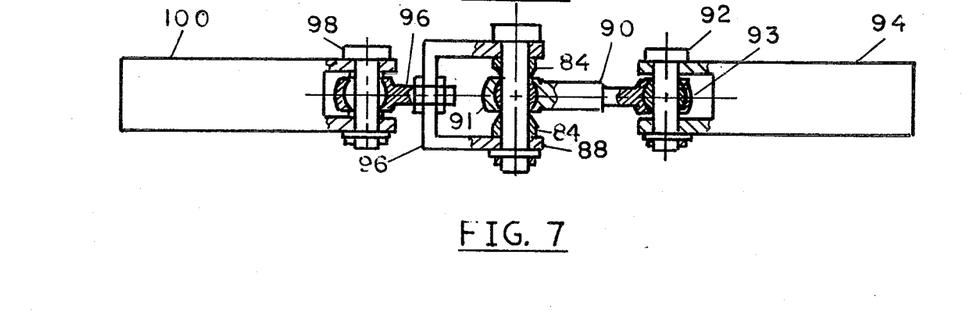
FIG. 7 is a sectional view taken along line E—E of FIG. 6.
Figure 8:
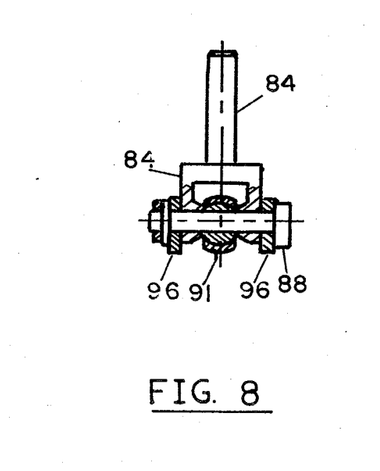
FIG. 8 is a sectional view of the sliding rod link of the four link mechanism taken along line D—D of FIG. 6.

The four link mechanism 74 includes a slide rod link 84 slideably received along one end within the bore 53 in the integral axle 51 of the frame 41 (FIGS. 4 and 5). The bore is coaxial with the X axis 43. The other end of the slide rod link 84 is bifurcated and has axially aligned openings adapted to receive a pivot pin 88 which allows pivotal movement about pivot point 80 (FIG. 8). Forward rod link 90 is connected to pin 88 between the bifurcated arms of slide rod link 84, by a generally spherical bearing 91. The other end of forward rod link 90 is connected to pin 92, which defines pivot point 78, through a generally spherical bearing 93. Fixed rod link 94 is rigidly mounted on the rearward end 54 of the leading tow bar 49 and has a forked or bifurcated end pivotally mounted on pin 92, as seen in FIGS. 6 and 7. Therefore, pivot point 78 is fixed relative to the rearward end of the leading tow bar 40.

A rearward rod link 96 is bifurcated so as to have two arms which are juxtaposed with the arms of the forked end of sliding rod 84 with the generally spherical bearing 91 of forward rod link 90 being centered therebetween (FIG. 8). The other end of rearward rod link 96 is pivotally connected by a cylindrical bearing to pin 98, which pin defines pivot point 82. Second fixed rod link 100 is rigidly mounted on the forward end 50 of the trailing tow bar and has a forked or bifurcated end pivotally mounted on pin 98, as seen in FIGS. 6 and 7. There pivot point 82 is fixed relative to the forward end of the trailing tow bar.

Pivot point 76 is located on and fixed relative to the vertical axis 47. Pivot points 78 and 82 are at fixed positions relative to the rearward end 54 of the leading tow bar 40 and the forward end 50 of the trailing tow bar 40 respectively. Pivot point 80 moves along X axis 43, but is slideably connected by the rod link 84 to the frame 41 through the bore 53. Therefore the four link mechanism 74 interconnects each part of the chain 32, vertical axle, frame and tow bars, so that pivotal movement of the tow bars about the Y axis 45 maintains the X axis 43 in a position bisecting an angle between the two tow bars.

The geometry of the pivot points 76, 78, 80 and 82 (FIG. 6) is such that the distance between pivot points 78 and 80, and between pivot points 78 and 76 is equal to the distance between pivot points 82 and 80, and between pivot points 82 and 76 respectively (FIG. 7). Any change of angle between one of the tow bars 40 and the X axis 43 is equalized by the four link mechanism 74 to the angle the other tow bar 40 makes with the X axis. The X axis 43 is automatically maintained by the link mechanism 74 along a line that bisects the angle between the two tow bars.

If the X axis 43, which is coaxial with the rotational axis of the horizontal wheels 42, is positioned by the four link mechanism 74 so as to always bisect the angle between adjacent tow bars 40 interconnected by the link 38, then the X axis is always perpendicular to a line tangent to the curve of the chain rail assembly 34 through the single point 49, placing the horizontal wheels 42 in ideal position. This might be more clearly illustrated by imagining three successive links 38, represented by points 49, which are connected by two equal length lines, representing the tow bars 40. A third line is constructed through the middle point 49 tangent to the curve of the chain rail. A fourth line perpendicular to the third line through point 49 will bisect the angle between the first two lines. It can be seen that if the wheels 42 were maintained on the fourth line, which wheels always rotate about the X axis 43, which axis would be perpendicular to a tangent line to the curve of the chain rail assembly 34 at the point 49.

In operation, as the preceding tow bar 40 passes into a horizontal turn, the link mechanism 74 moves the frame 41 to set the X axis 43, i.e. the rotational axis of the horizontal wheels 42, in ideal position besecting the angle between the leading and trailing tow bars. As the chain 32 goes through a horizontal turn, if the tow bars 40 on either side of the link 38 form equivalent angles with the X axis 43 of the frame 41, then the X axis of the frame of the link must lie along a line perpendicular to a tangent of the horizontal curve at the point 49 the link is located along that curve.

Adjacent tow bars are also aligned along the predetermined path by the four link mechanism 74. When universally connected to the link 38, the tow bars can pivot about Y axis 45 and get out of alignment with a trailing or leading tow bar 40, resulting in collapse of the chain 32. The link mechanism prevents this by properly positioning the X axis 43.

Ideal position is not maintained for the vertical wheels 44. The vertical wheels 44 generally make an angle of 10 to 14 degrees with a tangent line to a curve of the chain rail assembly 34 when a vertical climb or descent is made and are not loaded while climbing or descending. Wear on the vertical wheels 44 is therefore not as great a factor as wear on the horizontal wheels 42.

The chain 32 and connected tray 22 are driven by several drive systems 130, seen schematically in FIG. 1, located along straight runs of the trolley track 24. Generally, the drive system includes a continuous loop 132 of standard chain having projections 134 extending between rails 34a and 34d and 34b and 34c respectively to engage radially extending lug 48 which project between the rails 34a and 34d and 34b and 34c (FIGS. 1, 2, 4 and 5). A motor 136 turns a sprocket 139 connected by the continuous loop to a second sprocket 138 to power the overall drive system.

The lugs 48 are attached near the forward end 50 of the tow bar 40. To stop the chain 32, the drive system is halted, and a second set of projections 135 of the drive system engages a lug 52, of reverse geometry to lugs 48, mounted at the trailing end 54 of the tow bars 40.

Figure 9:
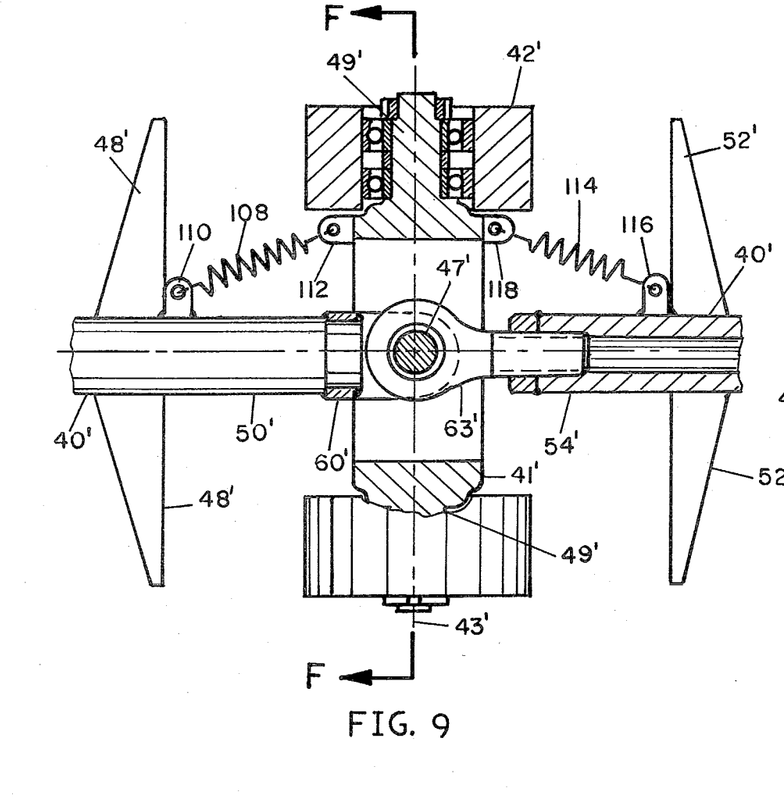
FIG. 9 is an enlarged sectional plan view of an alternative embodiment of the link of the present invention.
Figure 10:
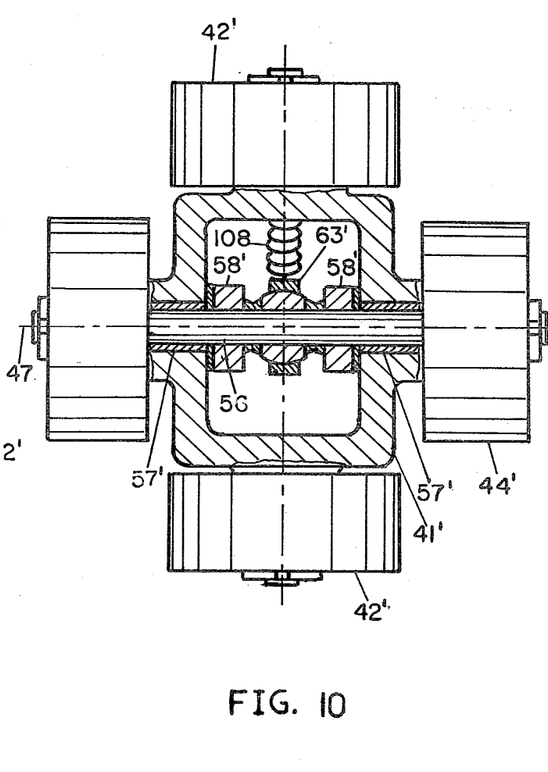
FIG. 10 is a sectional view taken along line F—F of FIG. 9.

In an alternative embodiment for maintaining the horizontal wheels 42 in ideal position, like parts being given prime suffixes, to the four link mechanism 74 (FIGS. 9 and 10) a trailing tow bar spring 108 is interconnected between a hinge 110 fixedly mounted to the tow bar 40' at forward end 50' and a hinge 112 rigidly connected to the frame 41'. In a similar manner, a forward tow bar spring 114 is interconnected between a hinge 116 rigidly connected to the rearward end 54' of the tow bar 40' and a hinge 118 rigidly connected to the frame 41'. The spring forces and lengths of springs 108 and 114 are equal, so that a set tension or compression force in spring 108 will be transferred across frame 41' to spring 114. The position where the springs are connected to the frame and two tow bars are equidistant from the X axis 43' and Y axis 45'. In a similar manner to the operation previously described the angle between the X axis 43' and the longitudinal axis of the leading tow bar 40' is transferred to the angle between the X axis 43' and the longitudinal axis of succeeding tow bar 40' to maintain ideal positioning of the frame 41'.

Figure 11:
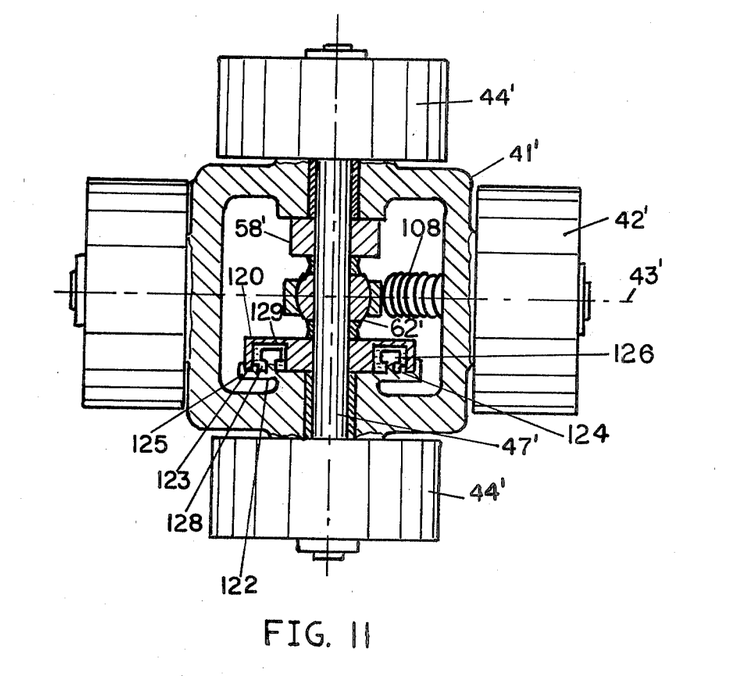
FIG. 11 is an enlarged sectional elevation view of the alternative embodiment of the link of the present invention, with a damping mechanism shown in full section.
Figure 12:
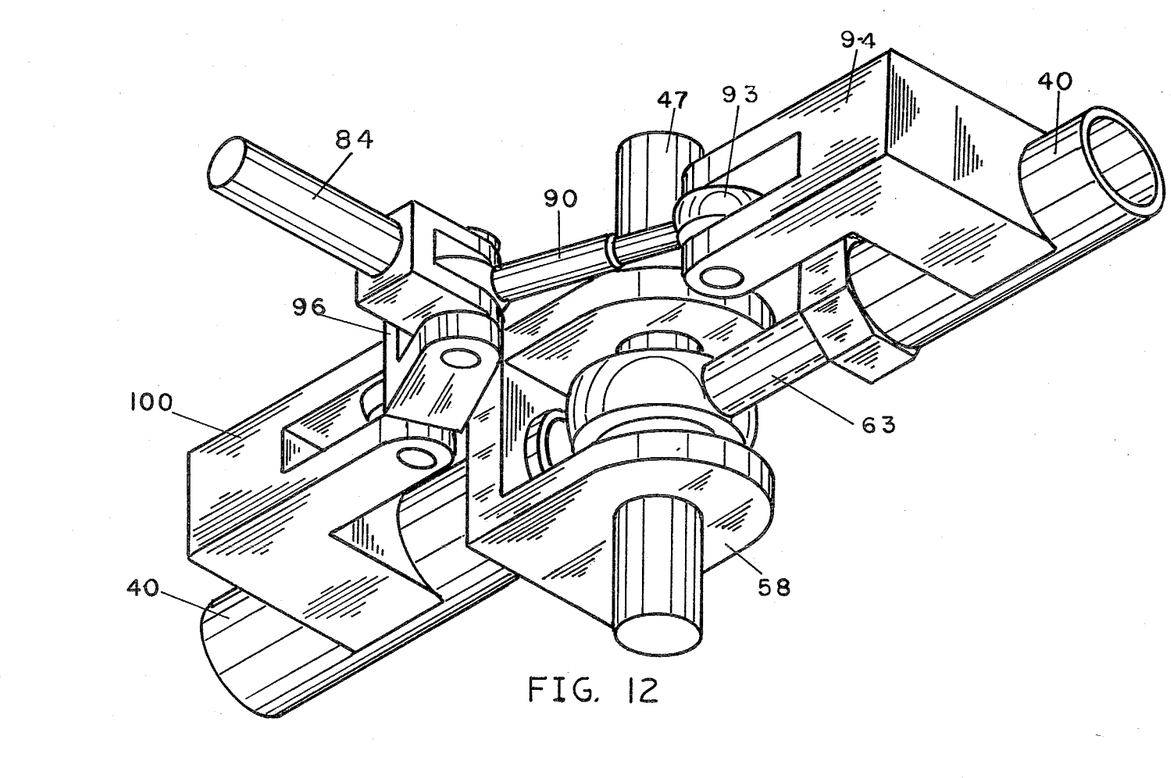
FIG. 12 is an enlarged perspective view of the four link mechanism of the present invention and the leading and trailing tow bars interconnected to the link mechanism and vertical axle, the frame of the chain being removed for clarity.
Figure 13:
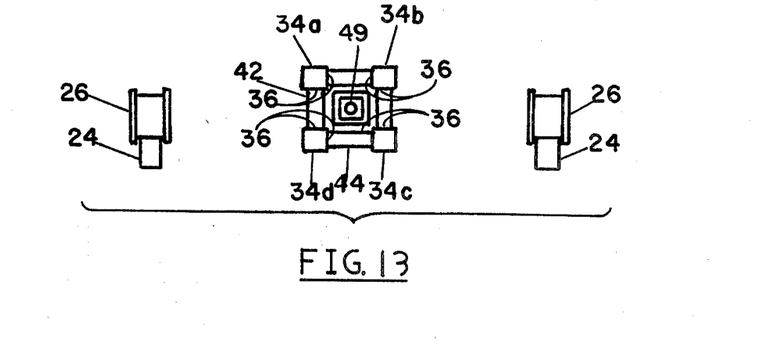
FIG. 13 is a sectional view taken along line B—B of FIG. 2.
Figure 14:
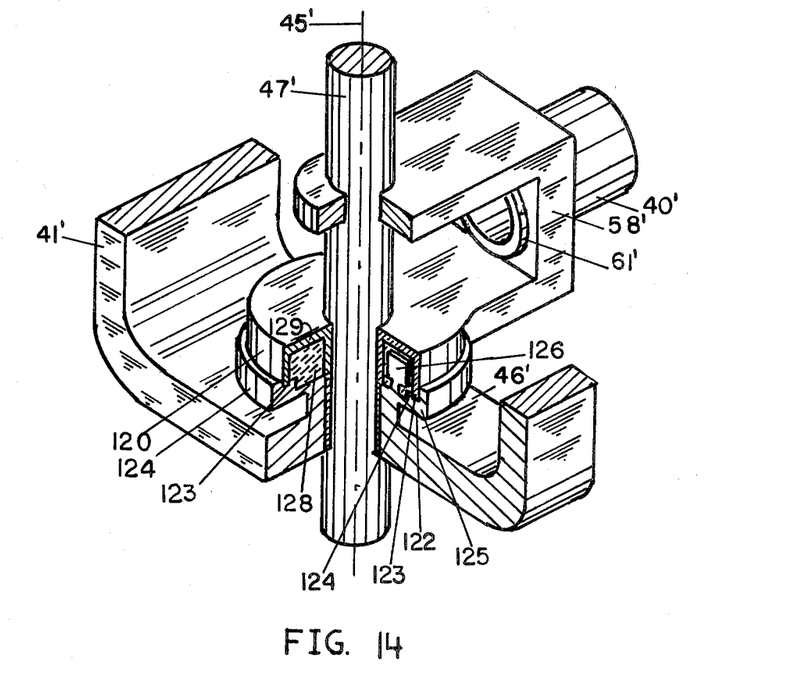
FIG. 14 is an enlarged fragmentary sectional perspective view of the damping mechanism of the alternative embodiment of the present invention.

FIGS. 11 and 14 show a construction for damping the automatic alignment system of the second embodiment utilizing springs 108 and 114. It is desired to damp the relative motion of the frame 41' about Y axis 45' relative to the forward end 50' of the tow bar 40' at the connection between the fork yoke 58' and the vertical axle 47'.

A generally disc shaped cylinder 120 having a depending skirt is integral to the lowermost arm of fork yoke 58'. The cylinder has a center on Y axis 45' and is rigidly connected to the vertical axis 47'. The cylinder extends radially away from the axle 47' and includes a circumferential volume 129 formed therein.

The cylinder 120 is seated into a bearing plate 122 which extends radially outward from the frame 41' in the opening 46' beyond the diameter of the cylinder. A circumferential seal 123 between the cylinder and the bearing plate is formed by integral flange lips 124 and 125 of the bearing plate which extend upwardly either side of the depending skirt of the cylinder.

The bearing plate 122 has a number of generally planar pistons 126 aligned along radii extending from Y axis 45' projecting into the volume 129 of the cylinder. The pistons are located at equally spaced intervals about the circumference of the bearing plate. The number of pistons depends on the spring force utilized, mass of the frame 41 and viscosity of fluid 128 contained in the volume 129. The piston has a lower surface, an upper surface and four side surfaces. These surfaces of the piston are resisted by the viscous fluid 128 as the fork and connected cylinder move about Y axis 45' relative to the frame and connected bearing plate. The viscous fluid 128 fills the space between the volumes of the cylinder 120 and the pistons, a damping effect is created by the fluid contacting the various surfaces of the piston.

Therefore, any outside force applied to horizontal wheels 42' will cause an oscillation of the frame 41' about the vertical axle 47'. The cylinder 120 and piston 126 acting against the viscous fluid 128 will quickly damp these oscillations. The four link mechanism 74 does not allow any oscillatory movement of the frame 41 about the vertical axle 47, and therefore no such damping is required for the preferred embodiment.

Though the abovedescribed invention has been described with a certain degree of particularity, nothing contained herein shall serve to limit the scope of the invention, particularly as described in the appended claims.

What is claimed is:

1. An endless chain adapted for three-dimensional movement along a predetermined path, comprising in combination:

a plurality of elongated arms and connecting members, each of said arms leading a following connecting member and trailing a previous connecting member, each of said connecting members being operably connected to the rearward end of a leading arm and the forward end of a trailing arm, said connecting members including first and second guide means for guiding said connecting members along said predetermined path, said first guide means having an axis extending generally along an X axis, and said second guide means having an axis extending generally along a Y axis which is perpendicular to and intersects said X axis; and a linkage system having a plurality of pivotally interconnected links, said linkage system operatively interconnecting said leading arm, said trailing arm and said connecting member, whereby the axis of said first guide means is always positioned so that an angle between said leading arm and said trailing arm, within a plane containing the X axis and lying perpendicular to the Y axis, is always bisected by the axis of said first guide means.

2. The invention defined in claim 1 wherein said predetermined path is defined by a chain rail assembly having four separate rails, each of said rails being parallel to the other rails.

3. The invention defined in claim 2 wherein said connecting member further includes:

a frame having an opening therein, and being positioned so as to be at least partially enclosed by the rails of the chain rail assembly, said opening being maintained in alignment with said predetermined path.

4. The invention defined in claim 3 wherein said first guide means includes:

a first pair of wheels having an axis of rotation coaxial with said X axis, said first pair of wheels being rotatably mounted on a pair of stub axles extending integrally away from said frame, said stub axles being coaxial with said X axis.

5. The invention defined in claim 4 wherein said second guide means includes:

a second pair of wheels having an axis of rotation coaxial with said Y axis, said second pair of wheels being rotatably mounted on an axle coaxial with said Y axis, said axle being rotatable relative to said frame.

6. The invention defined in claim 5 wherein one of said leading and trailing elongated arms is connected to said axle for pivotal movement about said Y axis, and the other of said leading and trailing elongated arms is universally connected to said axle.

7. The invention defined in claim 6 wherein said linkage system includes:

a pair of springs of equal length and equal spring force, each of said springs interconnecting a first pair of points on said frame to a second pair of points on said elongated arms, said first pair of points and said second pair of points each being equidistant from said Y axis and from said X axis.

8. The invention defined in claim 6 further including means for damping relative motion between said frame and said pivotally connected elongated arm.

9. The invention defined in claim 3 wherein said linkage system further includes:
- a rod link, one end of said rod link being slidable along an opening in said frame, said opening being coaxial with the axis of rotation of said first pair of wheels, said opening formed along one of said stub axles of said frame;
- a forward link universally connected at one end to the other end of said rod link, the connection between said rod link and said forward link defining a first pivot point, the other end of said forward link being universally connected to the leading elongated arm, the connection between said forward link and said leading elongated arm defining a second pivot point, and a rearward link pivotally connected at one end to said rod link and universally connected to the same end to said forward link at said first pivot point, the other end of said rearward link being pivotally connected to the trailing elongated arm, the connection between said rearward link and said trailing elongated arm defining a third pivot point, the connection between said connecting members defining a fourth pivot point, the distance from said second pivot point to said first pivot point being equal to the distance from said third pivot point to the first pivot point which is equal distance from the fourth pivot point to the second pivot point and from the fourth pivot point to the third pivot point.

10. An endless chain adapted for three-dimensional movement along a predetermined path comprising, in combination:
- a chain rail assembly having four separate rails, each of said rails being parallel to the other rails and said chain rail assembly defining said predetermined path;
- a plurality of elongated arms and connecting members, each of said connecting members including a frame having an opening therein, each of said connecting members further being positioned so as to be at least partially enclosed by the rails of the chain rail assembly, said opening being maintained in alignment with said predetermined path, one of said arms leading each connecting member and another of said arms trailing each connecting member, each of said connecting members being operably connected to the rearward end of a leading arm and the forward end of a trailing arm;
- a first pair of wheels having an axis of rotation coaxial with an X axis extending transversely to said predetermined path, said first pair of wheels being rotatably mounted on a pair of stub axles extending integrally away from said frame of said connecting member, said stub axles being coaxial with said X axis; and
- a second pair of wheels having an axis of rotation coaxial with a Y axis, which Y axis is perpendicular to and intersects said X axis, said second pair of wheels being rotatably mounted on an axis coaxial with the Y axis, said axle being rotatable relative to said frame of said connecting member.

11. The invention defined in claim 10 wherein one of said leading and trailing elongated arms is connected to said axle for pivotal movement about said Y axis, and the other of said leading and trailing elongated arms is universally connected to said axle.

12. The invention defined in claim 11 wherein said linkage system includes:
- a pair of springs of equal length and equal spring force, each of said springs interconnecting a first pair of points on said frame to a second pair of points on said elongated arms, said first pair of points and said second pair of points each being equidistant from said Y axis and from said X axis.

13. The invention defined in claim 11 wherein said linkage system further includes:
- a rod link, one end of said rod link being slidable along an opening in said frame, said opening being coaxial with the axis of rotation of said first pair of wheels, said opening formed along one of said stub axles of said frame;
- a forward link universally connected at one end to the other end of said rod link, the connection between said rod link and said forward link defining a first pivot point, the other end of said forward link being universally connected to the leading elongated arm, the connection between said forward link and said leading elongated arm defining a second pivot point, and a rearward link pivotally connected at one end to said rod link and universally connected to the same end to said forward link at said first pivot point, the other end of said rearward link being pivotally connected to the trailing elongated arm, the connection between said rearward link and said trailing elongated arm defining a third pivot point, the connection between said connecting members defining a fourth pivot point, the distance from said second pivot point to said first pivot point being equal to the distance from said third pivot point to the first pivot point which is equal to the distance from the fourth pivot point to the second pivot point and from the fourth pivot point to the third pivot point.

14. An endless chain adapted for three-dimensional movement along a predetermined path comprising, in combination:
- a plurality of elongated arms and connecting members, said connecting members including a frame having an opening therein and positioned so at least to be partially enclosed by a chain rail assembly having four separate rails, each of said rails being parallel to the other rails, one of said arms leading each connecting member and another of said arms trailing each connecting member, each of said connecting members operably connected to the rearward end of a leading arm and the forward end of a trailing arm, said connecting member including a first guide means having a first pair of wheels with an axis of rotation coaxial with an X axis, said first pair of wheels being rotatably mounted on a pair of stub axles extending integrally away from said frame, one of said leading and trailing arms being universally connected to said connecting member and the other of said leading and trailing arms being pivotably connected to said connecting member, said connecting members further including second guide means having a pair of wheels with an axis of rotation coaxial with a Y axis, said second pair of wheels being rotatably mounted on an axle, said Y axis being perpendicular to and intersecting said X axis.

15. The invention as defined in claim 14 wherein said second guide means includes:

a pair of springs of equal length and equal spring force, each of said springs interconnecting a pair of points on said frame to a second pair of points on each of said elongated arms, said first pair of points and said second pair of points being equidistant from said Y axis and from said X axis.

16. The invention as defined in claim 15 further including means for damping relative motion between said frame and said pivotably connected elongated arm.

17. The invention as defined in claim 14 wherein said second guide means is a linkage system further including:

a rod link, one end of said rod link being slidable along an opening in said frame, said opening being coaxial with the axis of rotation of said first pair of wheels, said opening formed along one of said stub axles of said frame;

a forward link universally connected at one end to the other end of said rod link, the connection between said rod link and said forward link defining a first pivot point, the other end of said forward link being universally connected to the leading elongated arm, the connection between said forward link and said leading elongated arm defining a second pivot point, and a rearward link pivotably connected at one end to said rod link and universally connected to the same end to said forward link at said first pivot point, the other end of said rearward link being pivotably connected to the trailing elongated arm, the connection between said rearward link and said trailing elongated arm defining a third pivot point, the connection between said connecting members defining a fourth pivot point, the distance from said second pivot point to said first pivot point being equal to the distance from said third pivot point to the first pivot point and the distance from the fourth pivot point to the second pivot point being equal to the distance from the fourth pivot point to the third pivot point.

* * * * *